US010626798B2

(12) United States Patent
Hill et al.

(10) Patent No.: US 10,626,798 B2
(45) Date of Patent: Apr. 21, 2020

(54) DIFFUSER MOUNTED FUEL-AIR HEAT EXCHANGER

(71) Applicant: United Technologies Corporation, Farmington, CT (US)

(72) Inventors: James D. Hill, Tolland, CT (US); Steven J. Laporte, Coventry, CT (US); Wendell V. Twelves, Jr., Glastonbury, CT (US); Stephen K. Kramer, Cromwell, CT (US); Simon Pickford, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/963,545

(22) Filed: Dec. 9, 2015

(65) Prior Publication Data
US 2017/0167385 A1 Jun. 15, 2017

(51) Int. Cl.
*F02C 7/18* (2006.01)
*F02C 7/141* (2006.01)
*F02C 7/224* (2006.01)

(52) U.S. Cl.
CPC .............. *F02C 7/185* (2013.01); *F02C 7/141* (2013.01); *F02C 7/224* (2013.01); *F05D 2240/36* (2013.01); *F05D 2260/213* (2013.01); *Y02T 50/671* (2013.01); *Y02T 50/676* (2013.01)

(58) Field of Classification Search
CPC .... F02C 7/18; F02C 7/185; F02C 7/16; F02C 7/141; F02C 7/244; F02C 6/08; F02C 9/52; F02C 9/18; F02C 7/224; F05D 2260/213; F05D 2240/36; F23R 3/30
See application file for complete search history.

(56) References Cited

U.S. PATENT DOCUMENTS

| 4,120,150 | A | * | 10/1978 | Wakeman | F02C 7/185 60/39.091 |
| 4,409,791 | A | * | 10/1983 | Jourdain | F02C 7/222 60/240 |
| 5,619,855 | A | | 4/1997 | Burrus | |
| 6,422,020 | B1 | * | 7/2002 | Rice | F02C 7/00 60/730 |
| 6,672,072 | B1 | | 1/2004 | Giffin, III | |
| 7,823,389 | B2 | * | 11/2010 | Seitzer | F01D 11/24 60/782 |
| 7,827,795 | B2 | * | 11/2010 | Hicks | F02C 3/30 60/39.83 |

(Continued)

*Primary Examiner* — Carlos A Rivera
*Assistant Examiner* — Stephanie Cheng
(74) *Attorney, Agent, or Firm* — Cantor Colburn LLP

(57) ABSTRACT

A thermal energy exchange system for cooling air of a gas turbine engine includes a heat exchanger located at a diffuser of the gas turbine engine. The diffuser is positioned axially between a compressor and a combustor of the gas turbine engine. A fuel source is operably connected to the heat exchanger to direct a flow of fuel through the heat exchanger via a fuel pipe and toward a fuel nozzle of the combustor. An airflow inlet directs a cooling airflow through the heat exchanger to reduce an airflow temperature via thermal energy exchange between the cooling airflow and the flow of fuel. An airflow outlet directs the cooling airflow from the heat exchanger toward one or more of components of the turbine to cool the one or more components.

15 Claims, 5 Drawing Sheets

(56) References Cited

U.S. PATENT DOCUMENTS

| | | | | |
|---|---|---|---|---|
| 8,858,161 B1 * | 10/2014 | Ryznic | ............... | F02C 7/143 |
| | | | | 415/1 |
| 9,932,940 B2 * | 4/2018 | Lo | ..................... | F02M 31/20 |
| 2005/0268619 A1 * | 12/2005 | Ress, Jr. | ............ | F01D 5/082 |
| | | | | 60/782 |
| 2013/0186100 A1 | 7/2013 | Rhoden et al. | | |

* cited by examiner

DIFFUSER MOUNTED FUEL-AIR HEAT EXCHANGER

BACKGROUND

This disclosure relates to gas turbine engines, and more particularly to the provision of cooling air for internal components of gas turbine engines.

Gas turbine engines, such as those used to power modern commercial and military aircraft, generally include a compressor section to pressurize an airflow, a combustor section for burning hydrocarbon fuel in the presence of the pressurized air, and a turbine section to extract energy from the resultant combustion gases. The airflow flows along a gas path through the gas turbine engine.

Operating temperatures in the turbine section and high pressure compressor portion of the gas turbine engine often exceed the maximum useful temperature of materials used in the components in those portions of the gas turbine engine, so cooling is provided to many of these components via a flow of lower temperature cooling air drawn from other portions of the gas turbine engine. Typical gas turbine engines use engine bypass air (fan bypass) in an air-to-air heat exchanger to lower the temperature of cooling air supplied to the high pressure compressor and the turbine section. Although this method does cool the cooling air sufficiently for current engine configurations there is an upper limit to the amount of cooling available. Further, air-to-air heat exchangers used to cool the cooling air increase weight and packaging volume and are relatively inefficient in cooling air, as the heat that is removed from the cooling air is lost to the cycle.

SUMMARY

In one embodiment, a thermal energy exchange system for cooling air of a gas turbine engine includes a heat exchanger located at a diffuser of the gas turbine engine. The diffuser is positioned axially between a compressor and a combustor of the gas turbine engine. A fuel source is operably connected to the heat exchanger to direct a flow of fuel through the heat exchanger via a fuel pipe and toward a fuel nozzle of the combustor. An airflow inlet directs a cooling airflow through the heat exchanger to reduce an airflow temperature via thermal energy exchange between the cooling airflow and the flow of fuel. An airflow outlet directs the cooling airflow from the heat exchanger toward one or more of components of the turbine to cool the one or more components.

Additionally or alternatively, in this or other embodiments the heat exchanger is positioned between an outer diffuser wall and an inner diffuser wall.

Additionally or alternatively, in this or other embodiments the airflow inlet is located at an outer diffuser wall.

Additionally or alternatively, in this or other embodiments one or more ducting surfaces extend from the heat exchanger to a diffuser wall to direct the cooling airflow from the airflow inlet across the heat exchanger.

Additionally or alternatively, in this or other embodiments the heat exchanger is one of a tube and fin heat exchanger or a tube and pin heat exchanger.

Additionally or alternatively, in this or other embodiments the fuel nozzle and the heat exchanger are a modular replaceable unit.

In another embodiment a gas turbine engine includes a compressor section to compress an airflow, a combustor section to inject a fuel flow into the compressed airflow and combust the fuel flow and a turbine section to convert combustion products into rotational energy. A thermal energy exchange system includes a heat exchanger positioned at a diffuser. The diffuser is positioned axially between the compressor and the combustor. A fuel source is operably connected to the heat exchanger to direct the fuel flow through the heat exchanger via a fuel pipe and toward a fuel nozzle of the combustor. An airflow inlet directs a cooling airflow through the heat exchanger to reduce a cooling airflow temperature via thermal energy exchange with the fuel flow. A cooling airflow outlet directs the cooling airflow from the heat exchanger toward one or more of components of the turbine to cool the one or more components.

Additionally or alternatively, in this or other embodiments the heat exchanger is positioned between an outer diffuser wall and an inner diffuser wall.

Additionally or alternatively, in this or other embodiments the airflow inlet is located at an outer diffuser wall.

Additionally or alternatively, in this or other embodiments one or more ducting surfaces extend from the heat exchanger to a diffuser wall to direct the cooling airflow from the airflow inlet across the heat exchanger.

Additionally or alternatively, in this or other embodiments the heat exchanger is one of a tube and fin heat exchanger or a tube and pin heat exchanger.

Additionally or alternatively, in this or other embodiments the fuel nozzle and the heat exchanger are a modular replaceable unit.

Additionally or alternatively, in this or other embodiments the cooling airflow is utilized to cool one or more of a turbine rotor or a turbine stator of the gas turbine engine.

In yet another embodiment, a method of operating a gas turbine engine includes directing a fuel flow into a heat exchanger positioned at a diffuser of the gas turbine engine, the diffuser positioned axially between a compressor and a combustor of the gas turbine engine. A cooling airflow is directed into the diffuser and is flowed across the heat exchanger. Thermal energy is exchanged between the cooling airflow and the fuel flow to reduce a temperature of the cooling airflow. The cooling airflow is directed from the heat exchanger through a cooling airflow outlet and toward one or more turbine components of a turbine of the gas turbine engine to cool the one or more turbine components.

Additionally or alternatively, in this or other embodiments the fuel flow id directed from the heat exchanger into the combustor through a fuel nozzle and is ignited in the combustor.

Additionally or alternatively, in this or other embodiments the cooling airflow is directed into the diffuser via a cooling airflow inlet in an outer diffuser wall.

Additionally or alternatively, in this or other embodiments the cooling airflow is directed along one or more ducting surfaces extending from the heat exchanger to a diffuser wall to direct the airflow from the airflow inlet across the heat exchanger.

Additionally or alternatively, in this or other embodiments the heat exchanger is one of a tube and fin heat exchanger or a tube and pin heat exchanger.

Additionally or alternatively, in this or other embodiments the fuel nozzle and the heat exchanger are a modular replaceable unit.

Additionally or alternatively, in this or other embodiments the cooling airflow is directed to one or more of a turbine rotor or a turbine stator of the gas turbine engine.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
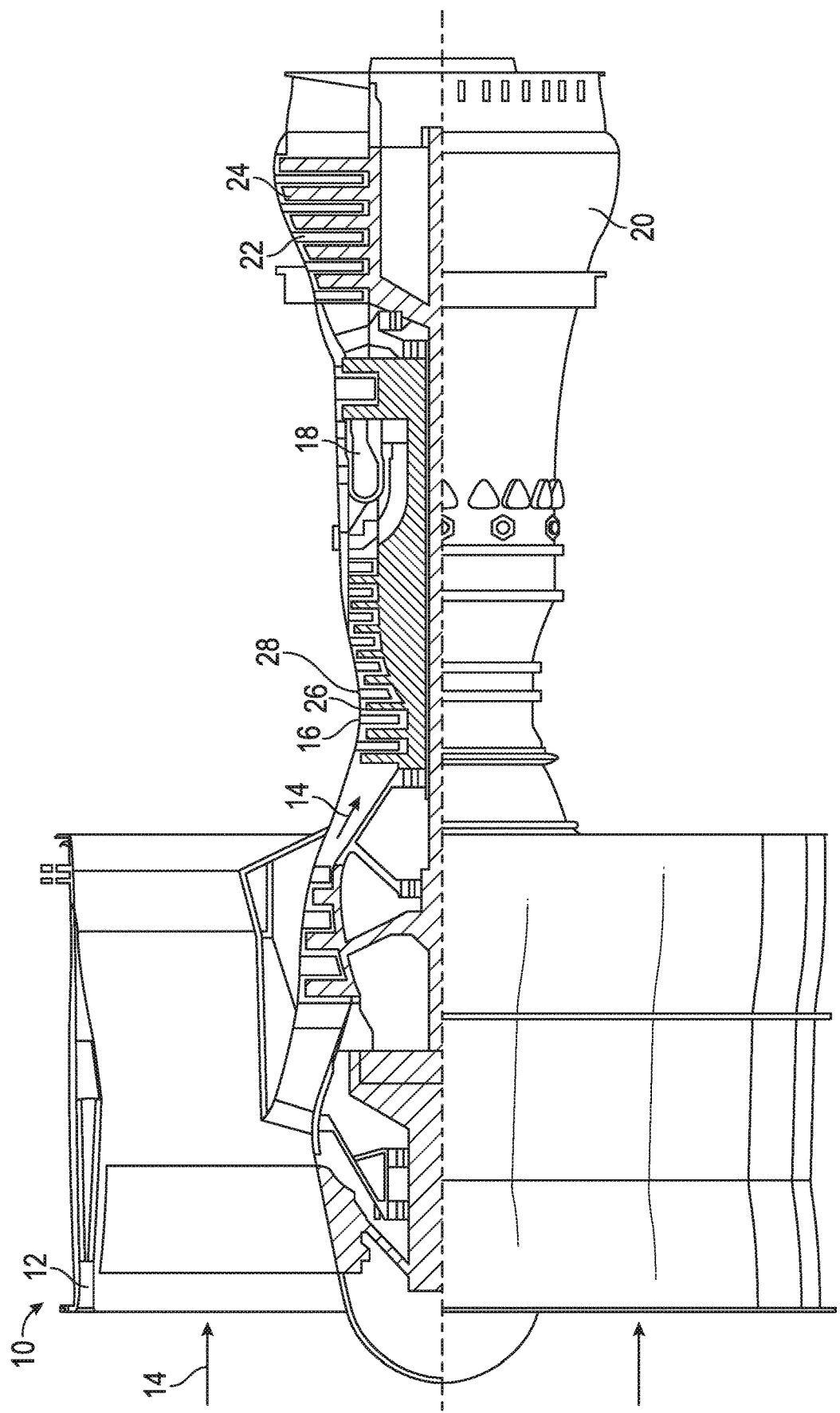
FIG. 1 illustrates a schematic cross-sectional view of an embodiment of a gas turbine engine.

FIG. 1 is a schematic illustration of a gas turbine engine 10. The gas turbine engine generally has a fan 12 through which ambient air is propelled in the direction of arrow 14, a compressor 16 for pressurizing the air received from the fan 12 and a combustor 18 wherein the compressed air is mixed with fuel and ignited for generating combustion gases.

The gas turbine engine 10 further comprises a turbine section 20 for extracting energy from the combustion gases. Fuel is injected into the combustor 18 of the gas turbine engine 10 for mixing with the compressed air from the compressor 16 and ignition of the resultant mixture. The fan 12, compressor 16, combustor 18, and turbine 20 are typically all concentric about a common central longitudinal axis of the gas turbine engine 10. In some embodiments, the turbine 20 includes one or more turbine stators 22 and one or more turbine rotors 24. Likewise, the compressor 16 includes one or more compressor rotors 26 and one or more compressor stators 28. While FIG. 1. illustrates a "two spool" engine configuration, having a low pressure spool including the fan 12 and a high pressure spool including the compressor 16 and turbine 20, the present disclosure may be readily applied to single spool or three spool engine configurations.

Figure 2:
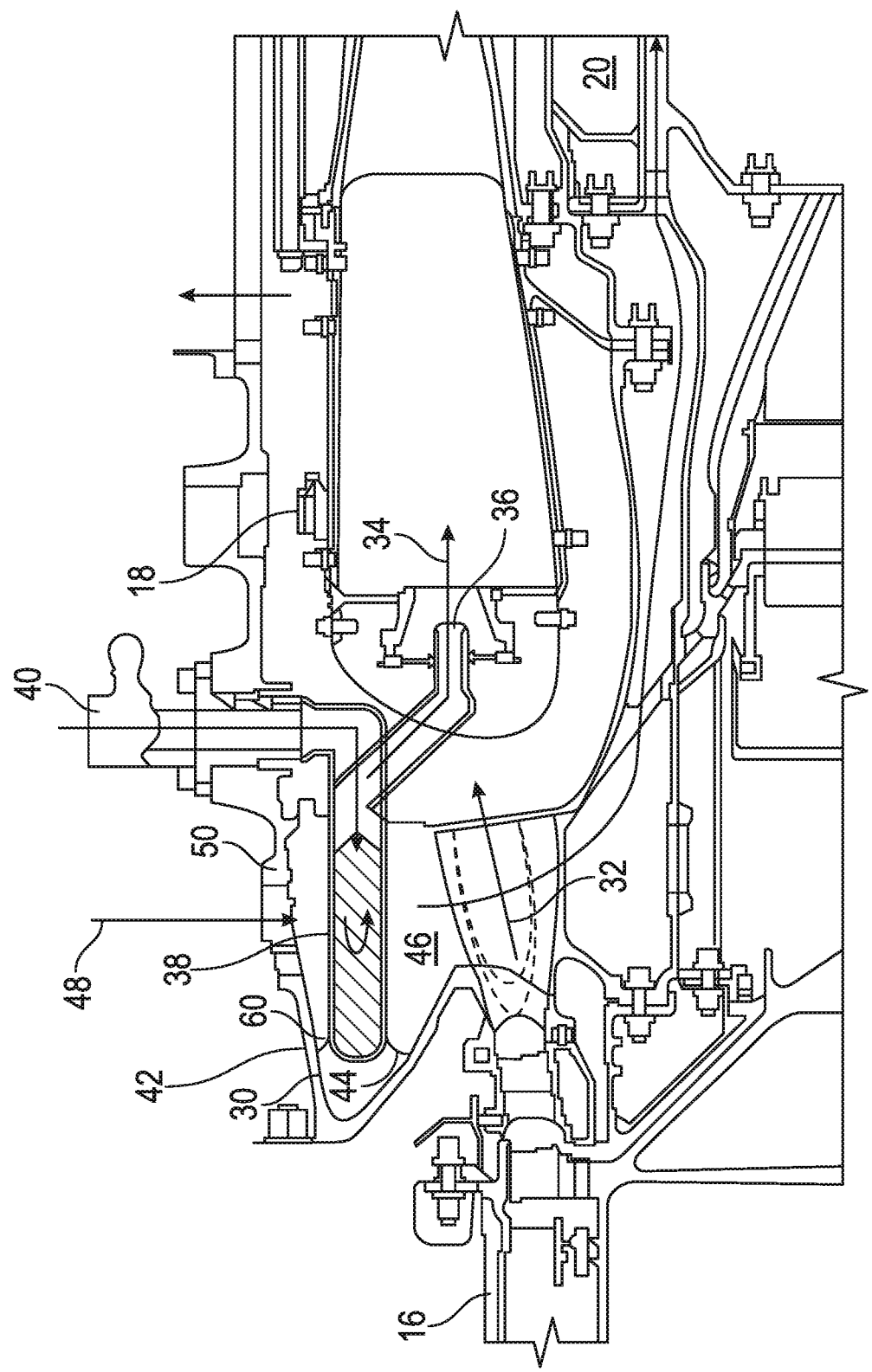
FIG. 2 illustrates a schematic cross-sectional view of an embodiment of a diffuser and combustor portion of a gas turbine engine.

Referring now to FIG. 2, the gas turbine engine 10 includes a diffuser 30 positioned between the compressor 16 and the combustor 18 to condition airflow 32 entering the combustor 18 for combustion. The airflow 32 is mixed with a fuel flow 34 injected into the combustor via a plurality of fuel nozzles 36 arranged around a circumference of the combustor 18, and ignited. The diffuser 30 further includes one or more heat exchangers 38 located therein, in some embodiments located between an outer diffuser wall 42 and an inner diffuser wall 44 defining a heat exchange chamber 46. The heat exchangers 38 are fluidly connected to both a fuel source 40 and one or more fuel nozzles 36 of the plurality of fuel nozzles 36. The fuel flow 34 flows from the fuel source and is circulated through the heat exchangers 38 to the plurality of fuel nozzles 36.

A turbine cooling and leakage airflow (TCLA) 48 is admitted to the diffuser 30, in particular into the heat exchange chamber 46 via a TCLA port 50 in the outer diffuser wall 42. The TCLA 48 may be from one of many sources in the gas turbine engine 10, including airflow diverted via ducting or other means from a high pressure source, such as the compressor 16. The TCLA 48 flows across the heat exchanger 38 and exchanges thermal energy with the fuel flow 34 circulating through the heat exchanger 38, cooling the TCLA 48 and warming the fuel flow 34. In some embodiments, the heat exchanger 38 includes ducting surfaces 60 extending from the heat exchanger 38 to the inner diffuser wall 44 to direct the TCLA 48 across the heat exchanger 38. Once cooled, the TCLA 48 is routed to the turbine 20 and directed to, for example, turbine stators 22 and/or turbine rotors 24 for cooling of the components.

Figure 3:
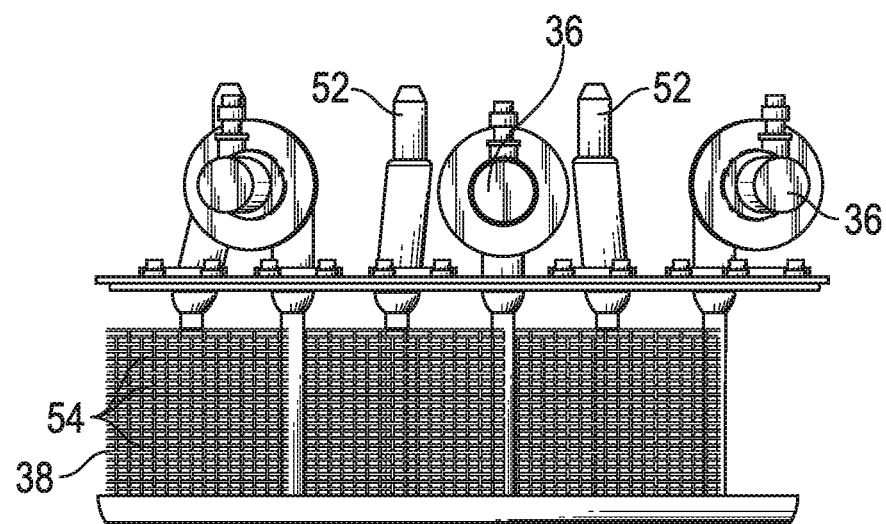
FIG. 3 is a plan view of an embodiment of a heat exchanger.
Figure 4:
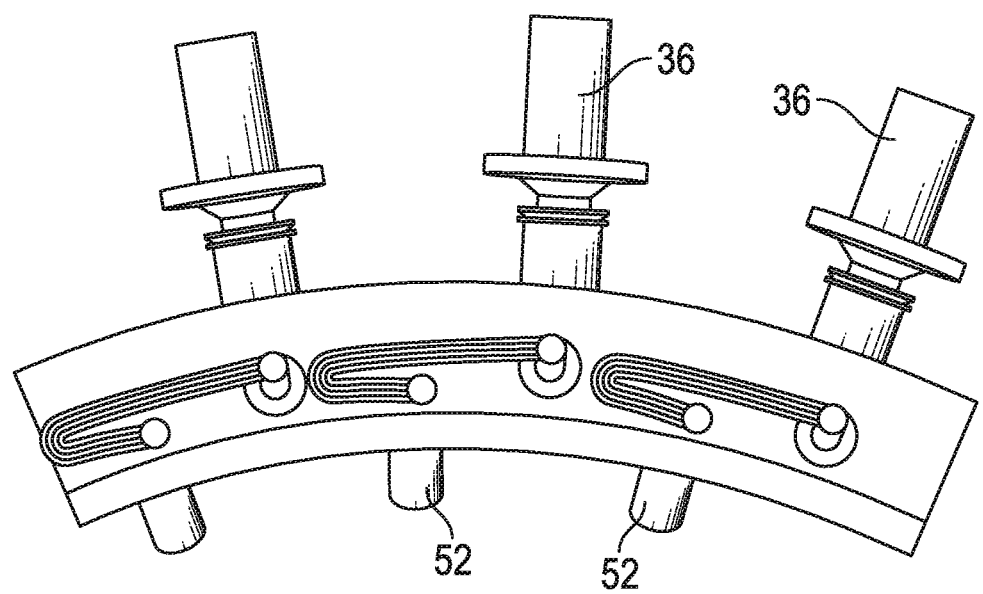
FIG. 4 is an end view of the heat exchanger of FIG. 3.
Figure 5:
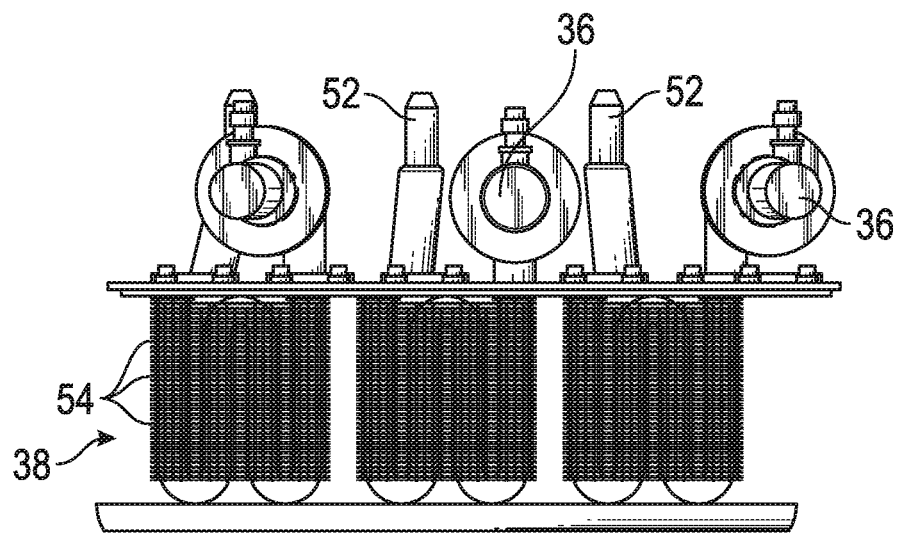
FIG. 5 is a plan view of another embodiment of a heat exchanger.
Figure 6:
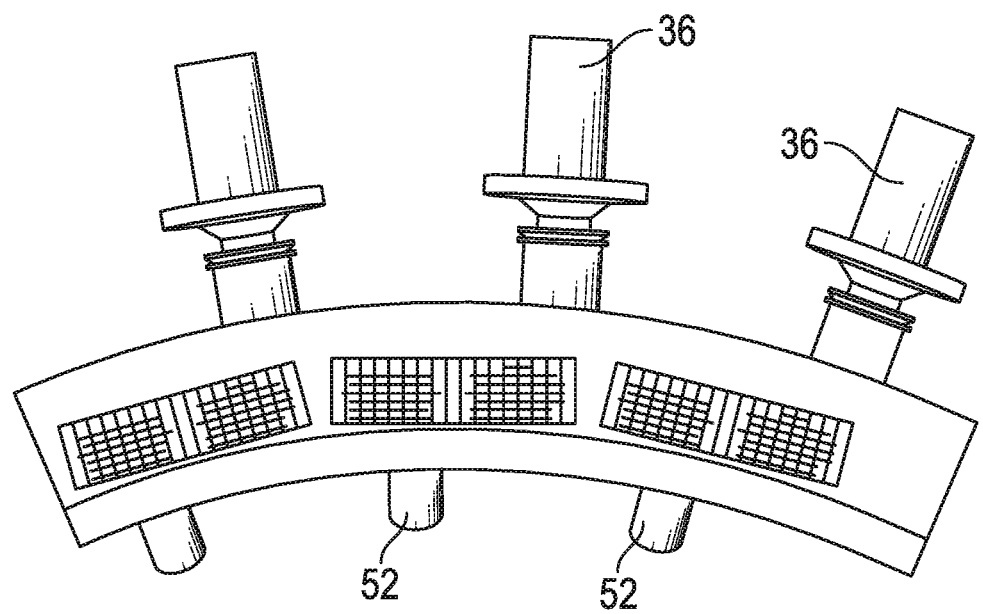
FIG. 6 is an end view of the heat exchanger of FIG. 5.
Figure 7:
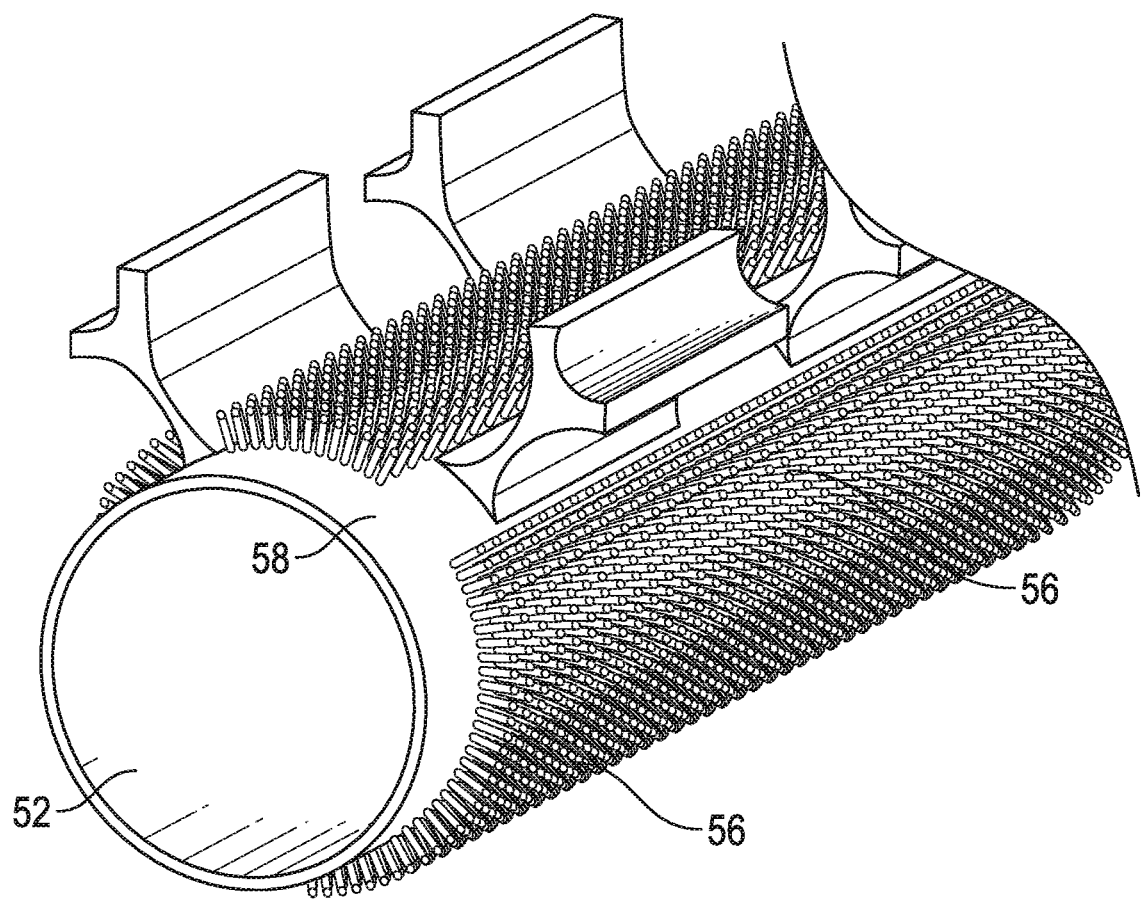
FIG. 7 is a partial perspective view of another embodiment of a heat exchanger.

Referring now to FIGS. 3-6, embodiments of tube and fin heat exchanger 38 configurations are illustrated. Shown in FIG. 3 is a view looking radially inwardly of an embodiment of heat exchanger 38. FIG. 4 is a view looking axially aftwardly of the embodiment shown in FIG. 3. In the embodiment of FIGS. 3 and 4, a fuel pipe 52 extends from the fuel source 40 to the fuel nozzle 36 in an axial direction along the heat exchanger 38 in a double-pass configuration with a plurality of fins 54 extending circumferentially outwardly from the fuel pipe 52 to increase heat exchange area of the heat exchanger 38 with the TCLA 48 flowing through the heat exchanger 38. In the embodiment shown in FIGS. 5 and 6, the fuel pipe 52 makes four passes through the heat exchanger 38 to further improve heat exchange. Another embodiment of a heat exchanger is shown in FIG. 7, with the fins 54 replaced with a plurality of pins 56 extending radially outwardly from a fuel pipe outer surface 58 to provide the increased surface area for thermal exchange. The heat exchanger 38 configurations shown in FIGS. 3-7 are merely examples. One skilled in the art will readily appreciate that other heat exchanger 38 configurations may be utilized to facilitate thermal energy exchange between the TCLA 48 and the fuel flow 34 flowing through the fuel pipe 52. In some embodiments, the heat exchangers 38 are modular units, with each fuel nozzle 36 having an independent associated heat exchanger 38. In the case of failure of a particular fuel nozzle 36 or damage to or failure of a particular heat exchanger 38, a particular fuel nozzle 36/heat exchanger 38 module may be shut down or replaced. The heat exchanger 38 utilizes a readily available source of cooling in the fuel to lower the temperature of the TCLA 48 for cooling of turbine 20 components. Further, the additional heat transferred to the fuel and combusted increases efficiency of the combustor 18 and improves specific fuel consumption.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A thermal energy exchange system for cooling air of a gas turbine engine comprising:
a heat exchanger disposed at a diffuser of the gas turbine engine, the diffuser positioned axially between a compressor and a combustor of the gas turbine engine and comprising an airflow passage for conducting airflow from the compressor to the combustor, the diffuser configured to condition airflow entering the combustor for combustion;

a fuel source operably connected to the heat exchanger to direct a flow of fuel through the heat exchanger via a fuel pipe and toward a fuel nozzle of the combustor;

an airflow inlet to direct a cooling airflow through the heat exchanger to reduce an airflow temperature via thermal energy exchange between the cooling airflow and the flow of fuel; and an airflow outlet to direct the cooling airflow from the heat exchanger toward one or more of components of the turbine to cool the one or more components;

wherein the heat exchanger is disposed between an outer diffuser wall located radially outboard of the combustor and an inner diffuser wall located radially outboard of the airflow passage of the diffuser; and wherein the airflow inlet extends through the outer diffuser wall, such that the cooling airflow flows through the airflow inlet in a radially inwardly direction toward the heat exchanger.

2. The thermal energy exchange system of claim 1, further comprising one or more ducting surfaces extending from the heat exchanger to the outer diffuser wall to direct the cooling airflow from the airflow inlet across the heat exchanger.

3. The thermal energy exchange system of claim 1, wherein the heat exchanger is one of a tube and fin heat exchanger or a tube and pin heat exchanger.

4. The thermal energy exchange system of claim 1, wherein the fuel nozzle and the heat exchanger comprise a modular replaceable unit.

5. A gas turbine engine, comprising:
a compressor section to compress a combustion airflow;
a combustor section to inject a fuel flow into the compressed combustion airflow and combust the fuel flow;
a turbine section to convert combustion products into rotational energy; and
a thermal energy exchange system including:
a heat exchanger disposed at a diffuser, the diffuser positioned axially between the compressor and the combustor and comprising an airflow passage for conducting airflow from the compressor to the combustor, and configured to condition airflow entering the combustor for combustion;
a fuel source operably connected to the heat exchanger to direct the fuel flow through the heat exchanger via a fuel pipe and toward a fuel nozzle of the combustor;
an airflow inlet to direct a cooling airflow through the heat exchanger to reduce a cooling airflow temperature via thermal energy exchange with the fuel flow; and
a cooling airflow outlet to direct the cooling airflow from the heat exchanger toward one or more of components of the turbine to cool the one or more components;
wherein the heat exchanger is disposed between an outer diffuser wall located radially outboard of the combustor and an inner diffuser wall located radially outboard of the airflow passage; and
wherein the airflow inlet extends through the outer diffuser wall, such that the cooling airflow flows through the airflow inlet in a radially inwardly direction toward the heat exchanger.

6. The gas turbine engine of claim 5, further comprising one or more ducting surfaces extending from the heat exchanger to the outer diffuser wall to direct the cooling airflow from the airflow inlet across the heat exchanger.

7. The gas turbine engine of claim 5, wherein the heat exchanger is one of a tube and fin heat exchanger or a tube and pin heat exchanger.

8. The gas turbine engine of claim 5, wherein the fuel nozzle and the heat exchanger comprise a modular replaceable unit.

9. The gas turbine engine of claim 5, wherein the cooling airflow is utilized to cool one or more of a turbine rotor or a turbine stator of the gas turbine engine.

10. A method of operating a gas turbine engine, comprising:
directing a fuel flow into a heat exchanger disposed at a diffuser of the gas turbine engine, the diffuser positioned axially between a compressor and a combustor of the gas turbine engine and comprising an airflow passage for conducting airflow from the compressor to the combustor, and configured to condition airflow entering the combustor for combustion;
directing a cooling airflow into the diffuser via a cooling airflow inlet in an outer diffuser wall, such that the cooling airflow flows through the cooling airflow inlet in a radially inwardly direction;
flowing the cooling airflow across the heat exchanger;
exchanging thermal energy between the cooling airflow and the fuel flow to reduce a temperature of the cooling airflow;
directing the cooling airflow from the heat exchanger through a cooling airflow outlet and toward one or more turbine components of a turbine of the gas turbine engine; and
cooling the one or more turbine components via the cooling airflow;
wherein the heat exchanger is disposed between the outer diffuser wall located radially outboard of the combustor and an inner diffuser wall located radially outboard of the airflow passage.

11. The method of claim 10, further comprising: flowing the fuel flow from the heat exchanger and into the combustor through a fuel nozzle; and
igniting the fuel flow in the combustor.

12. The method of claim 10, further comprising directing the cooling airflow along one or more ducting surfaces extending from the heat exchanger to the outer diffuser wall to direct the airflow from the airflow inlet across the heat exchanger.

13. The method of claim 10, wherein the heat exchanger is one of a tube and fin heat exchanger or a tube and pin heat exchanger.

14. The method of claim 10, wherein the fuel nozzle and the heat exchanger comprise a modular replaceable unit.

15. The method of claim 10, further comprising directing the cooling airflow to one or more of a turbine rotor or a turbine stator of the gas turbine engine.

* * * * *